(12) United States Patent
Han et al.

(10) Patent No.: US 11,742,486 B2
(45) Date of Patent: Aug. 29, 2023

(54) POSITIVE ACTIVE MATERIAL FOR LITHIUM-SULFUR BATTERY AND METHOD OF FABRICATING THE SAME

(71) Applicant: IUCF-HYU (INDUSTRY-UNIVERSITY COOPERATION FOUNDATION HANYANG UNIVERSITY, Seoul (KR)

(72) Inventors: Sung-Hwan Han, Seoul (KR); Joong-Hee Han, Vienna (AT)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 402 days.

(21) Appl. No.: 16/770,732

(22) PCT Filed: Dec. 6, 2018

(86) PCT No.: PCT/KR2018/015386
§ 371 (c)(1),
(2) Date: Jun. 8, 2020

(87) PCT Pub. No.: WO2019/112330
PCT Pub. Date: Jun. 13, 2019

(65) Prior Publication Data
US 2021/0167384 A1    Jun. 3, 2021

(30) Foreign Application Priority Data
Dec. 6, 2017   (KR) .................. 10-2017-0166638

(51) Int. Cl.
H01M 4/583    (2010.01)
H01M 4/04     (2006.01)
(Continued)

(52) U.S. Cl.
CPC ......... *H01M 4/583* (2013.01); *H01M 4/0471* (2013.01); *H01M 4/366* (2013.01);
(Continued)

(58) Field of Classification Search
None
See application file for complete search history.

(56) References Cited

U.S. PATENT DOCUMENTS

| 8,753,772 B2 | 6/2014 | Liu et al. |
| 2007/0099088 A1 | 5/2007 | Kwon et al. |

FOREIGN PATENT DOCUMENTS

| CN | 104495937 A | 4/2015 |
| KR | 10-2013-0119432 A | 10/2013 |

OTHER PUBLICATIONS

Zhengcui Wu et al. "Fabrication of defect-rich MoS$_2$ ultrathin nanosheets for application in lithium-ion batteries and supercapacitors", Journal of Materials Chemistry A, 2015, pp. 19445-19454, vol. 3.
(Continued)

*Primary Examiner* — Wyatt P McConnell
(74) *Attorney, Agent, or Firm* — Sughrue Mion, PLLC

(57) ABSTRACT

A positive active material for a lithium-sulfur battery is provided. The positive active material for a lithium-sulfur battery includes carbon layers and metal compound layers alternately and repeatedly stacked. Each of the metal compound layers includes molybdenum and sulfur. Sulfur of the positive active material for a lithium-sulfur battery is provided from the metal compound layer through a preliminary charge/discharge process.

14 Claims, 14 Drawing Sheets

(51) Int. Cl.
H01M 4/36 (2006.01)
H01M 4/38 (2006.01)
H01M 10/0525 (2010.01)
H01M 4/02 (2006.01)

(52) U.S. Cl.
CPC ......... *H01M 4/38* (2013.01); *H01M 10/0525* (2013.01); *H01M 2004/027* (2013.01); *H01M 2004/028* (2013.01)

(56) References Cited

OTHER PUBLICATIONS

Haiyan Wang et al., "Few-layer $MoS_2$ nanosheets incorporated into hierarchical porous carbon for lithium-ion batteries", Chemical Engineering Journal 288, 2016, pp. 179-184.
Wei Fu et al., "In situ catalytic growth of large-area multilayered graphene/$MoS_2$ heterostructures", Scientific Reports, 2014, pp. 4673(1)-4673(7), vol. 4.
Lu Chen et al., "$MoS_2$/graphene nanocomposite with enlarged interlayer distance as a high performance anode material for lithium-ion battery", Journal of Materials Research, 2016, 11 pages, vol. 31, No. 20.
Yumeng Shi et al., "Self-assembly of hierarchical $MoS_x$/CNT nanocomposites (2<x<3): towards high performance anode materials for lithium ion batteries", Scientific Reports, 2013, 8 pages.
Hao Luo et al., "Synthesis of $MoS_2$/C Submicrosphere by PVP-Assisted Hydrothermal Method for Lithium Ion Battery", Advanced Materials Research, 2012, pp. 471-477, vol. 531.
International search report for PCT/KR2018/015386 dated Mar. 14, 2019.
Written opinion for PCT/KR2018/015386 dated Mar. 14, 2019.
Communication dated May 19, 2022 from the Korean Patent Office in Korean Application No. 10-2017-0166638.
Siqi Yang, "Rechargeable Mg Batteries with Graphene-like MoS2 Cathode and Ultrasmall Mg Nanoparticle Anode", Advanced Materials, 2011, vol. 23, pp. 640-643 (5 pages total).
Hu et al., "Preparation of carbon coated $MoS_2$ flower-like nanostructure with self-assembled nanosheets as high-performance lithium-ion battery anodes", Journal of Materials Chemistry A, vol. 2, pp. 7862-7872, 2014 (11 pages total).
Zhao et al., "Self-Assembly-Induced Alternately Stacked Single-Layer $MoS_2$ and N-doped Graphene: A Novel van der Waals Heterostructure for Lithium-Ion Batteries", ACS Appl. Mater. Interfaces, 2016, vol. 8, pp. 2372-2379 (8 pages total).

[FIG. 1]
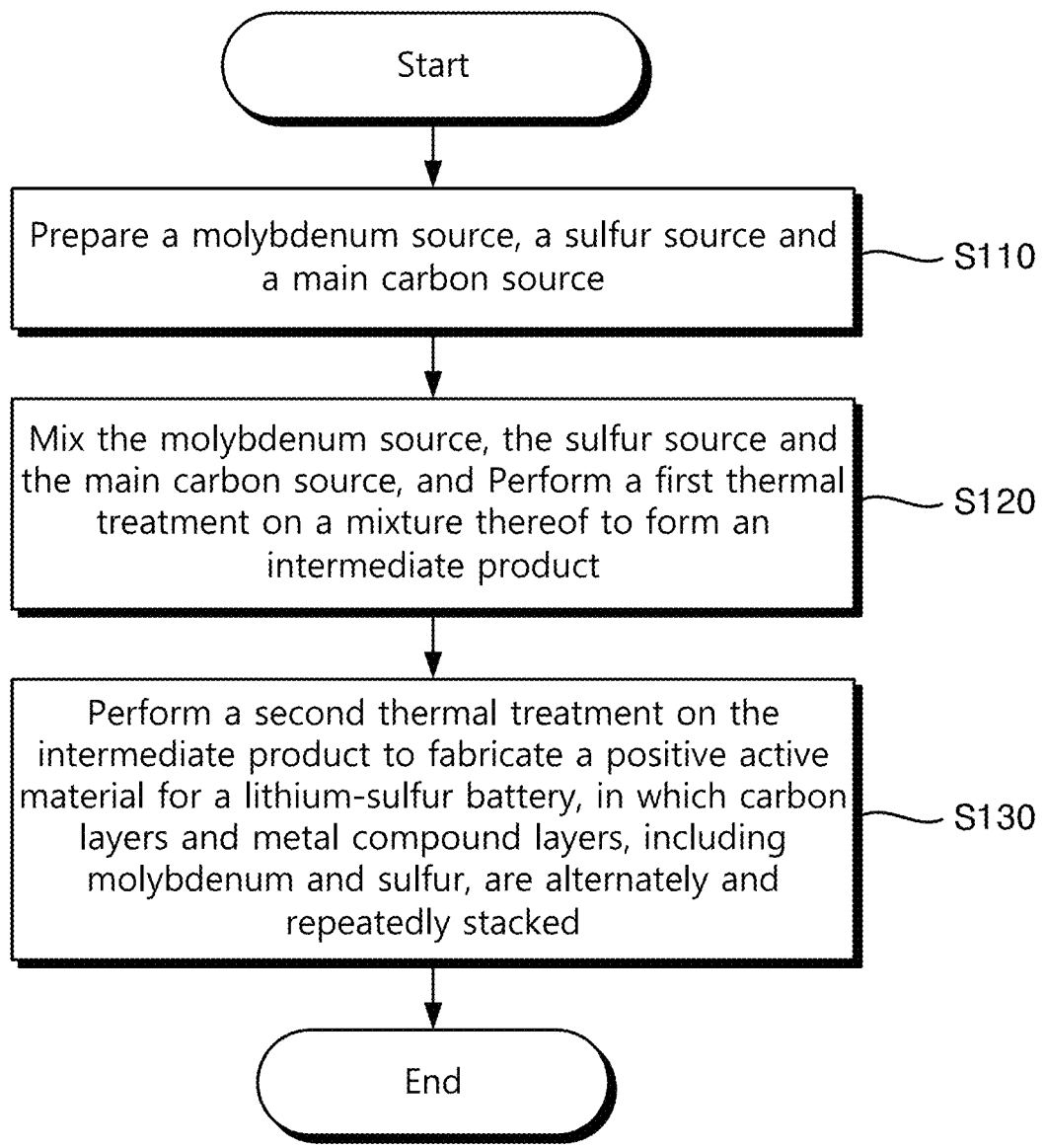

[FIG. 2]
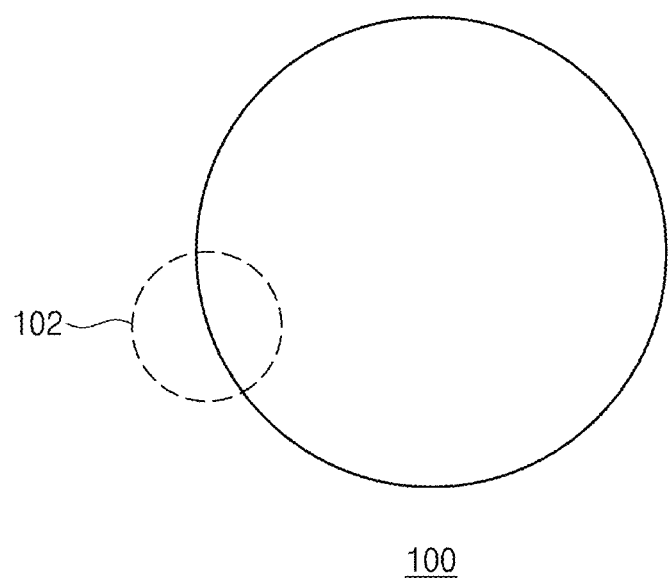
100
[FIG. 3]
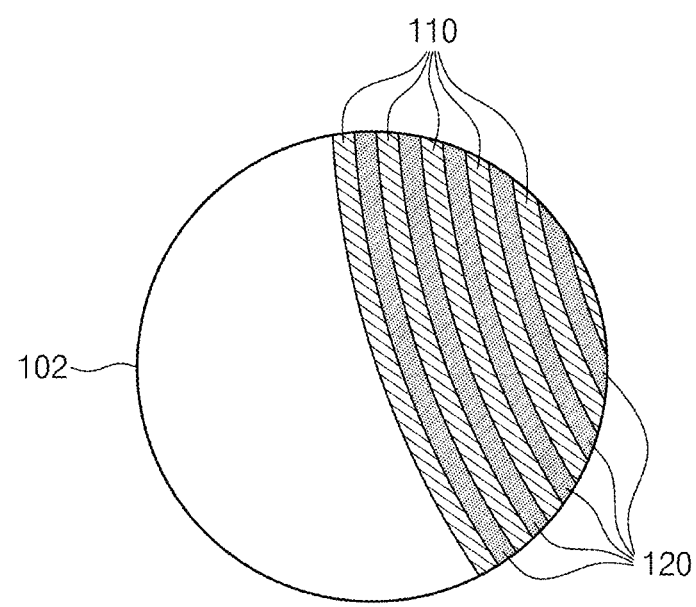

[FIG. 4]
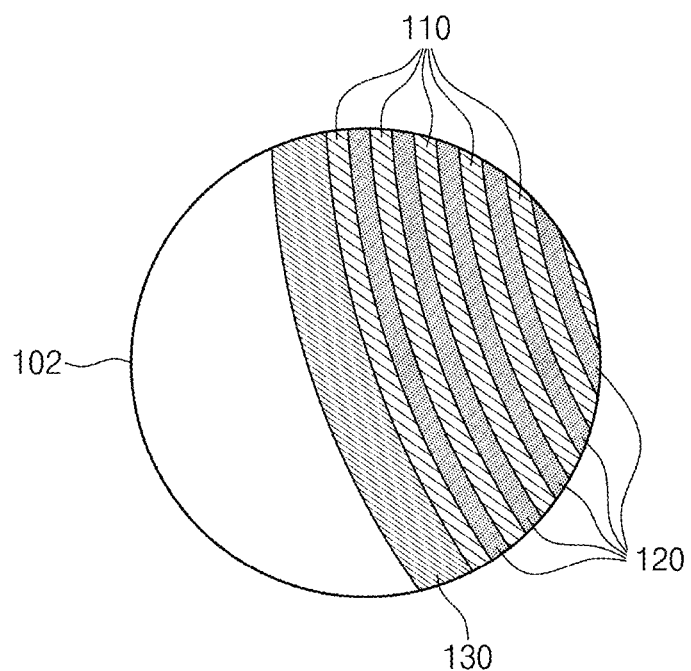
[FIG. 5]
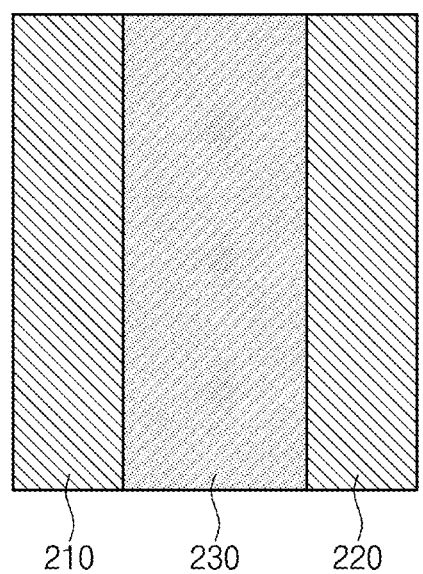

[FIG. 6]
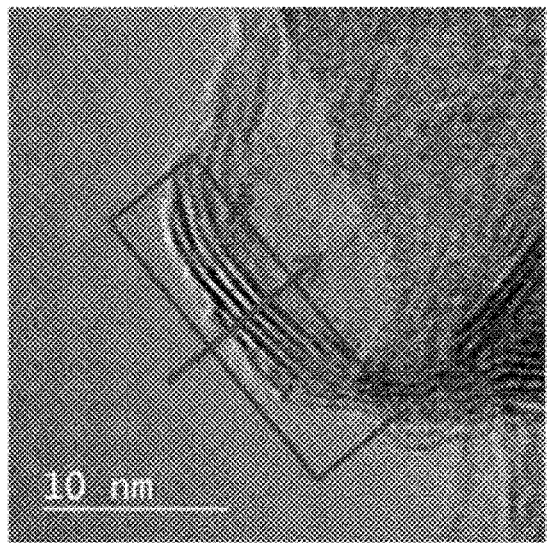

[FIG. 7]
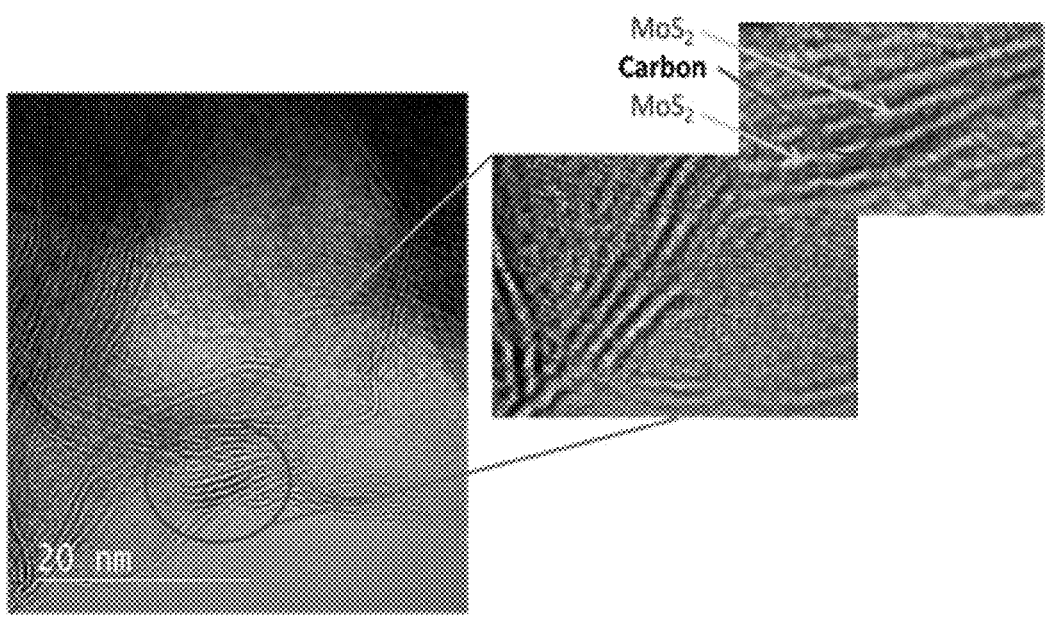

[FIG. 8]
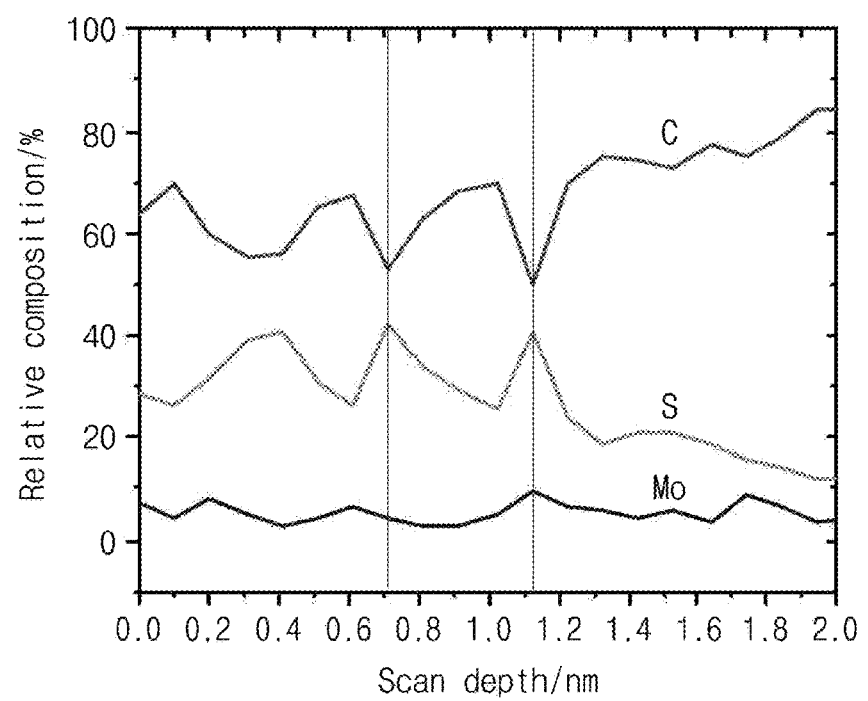

[FIG. 9]
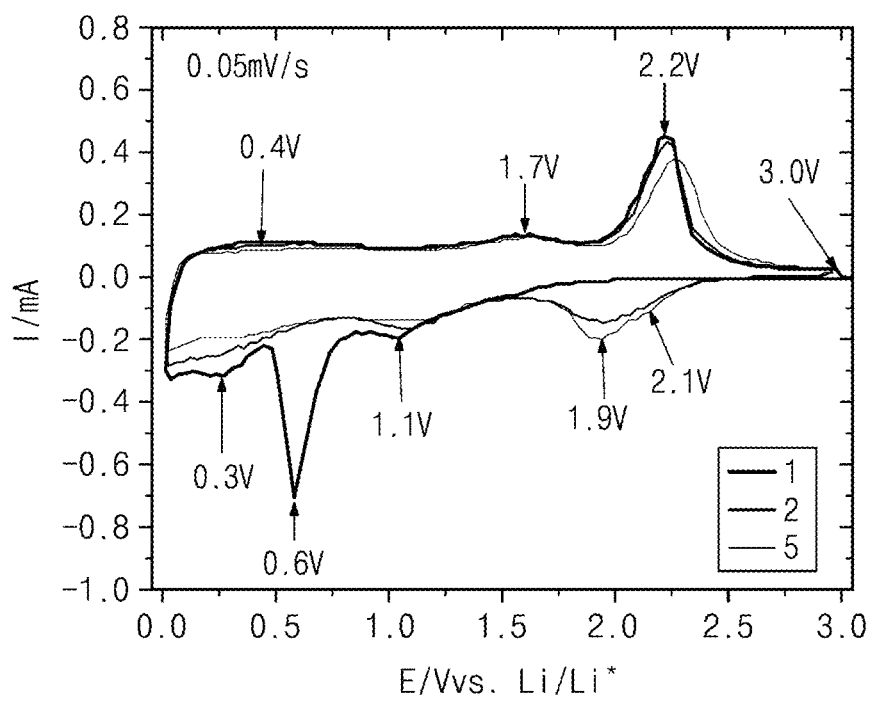

[FIG. 10]
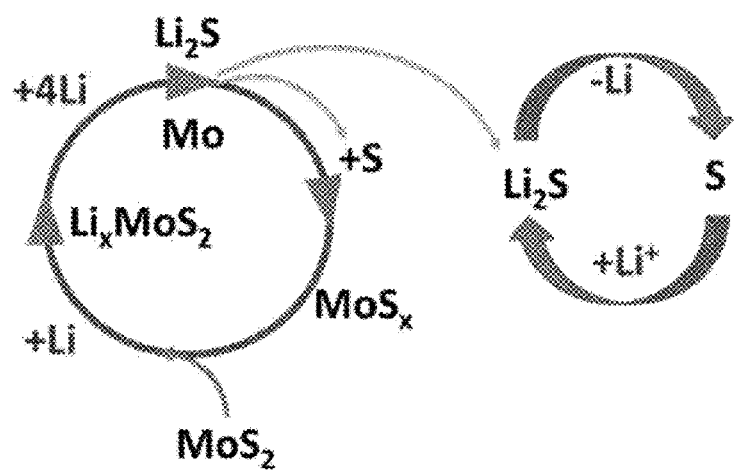

[FIG. 11]
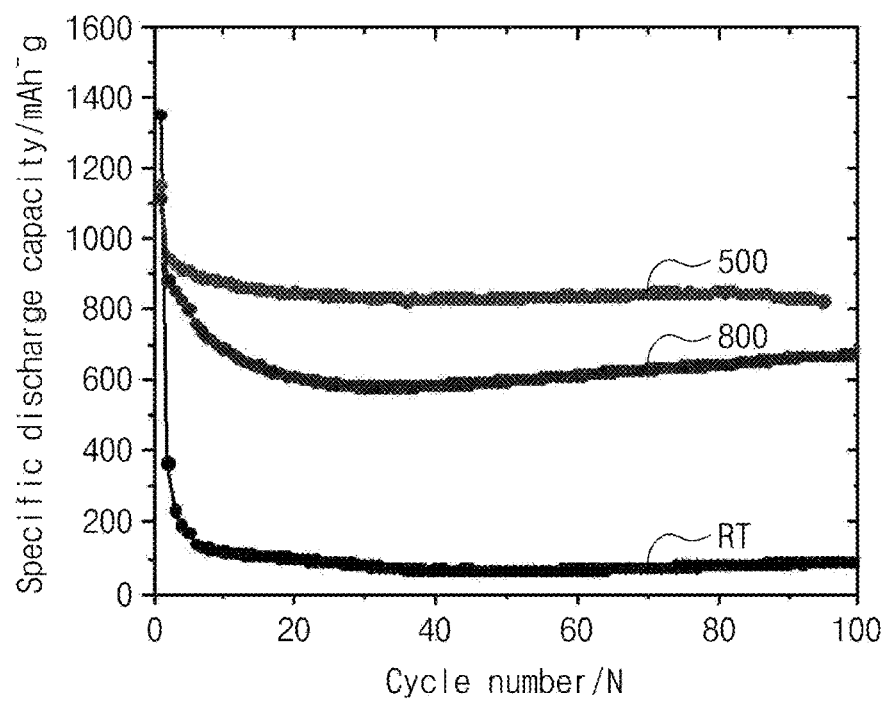

[FIG. 12]
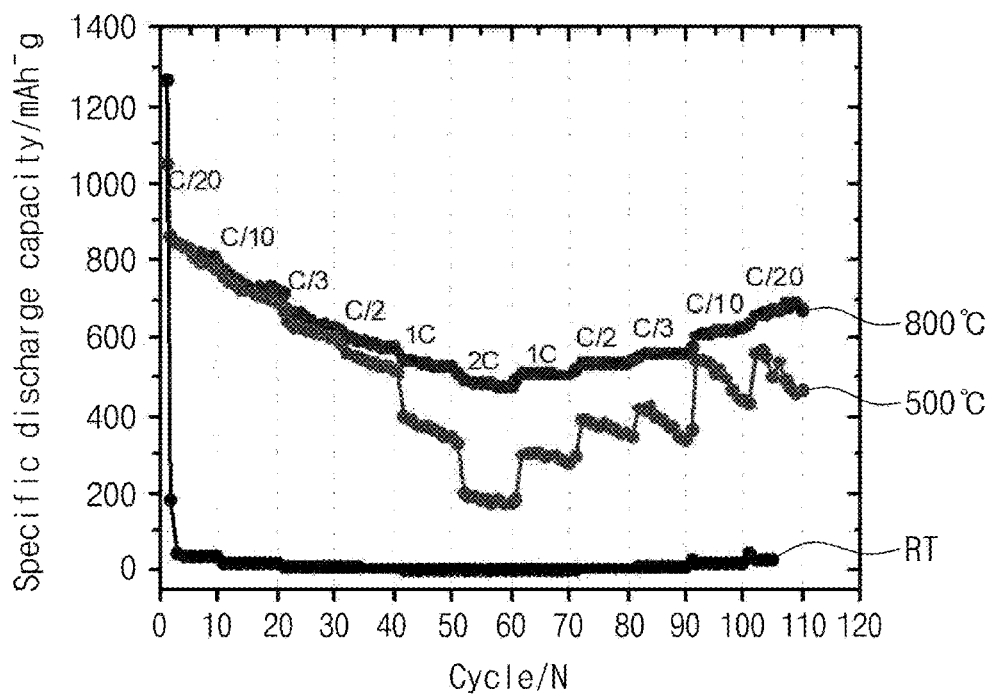

[FIG. 13]
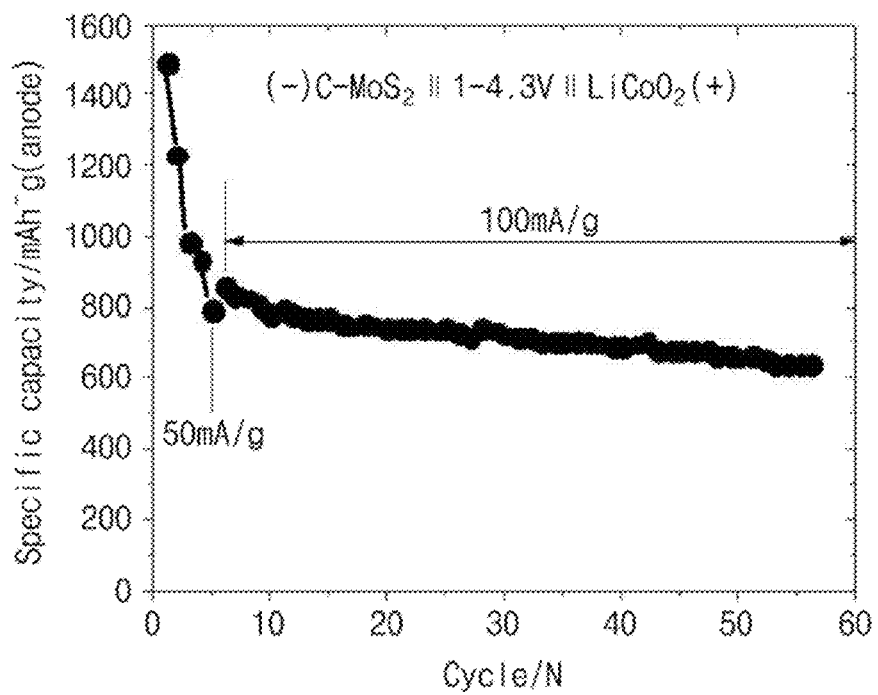

[FIG. 14]
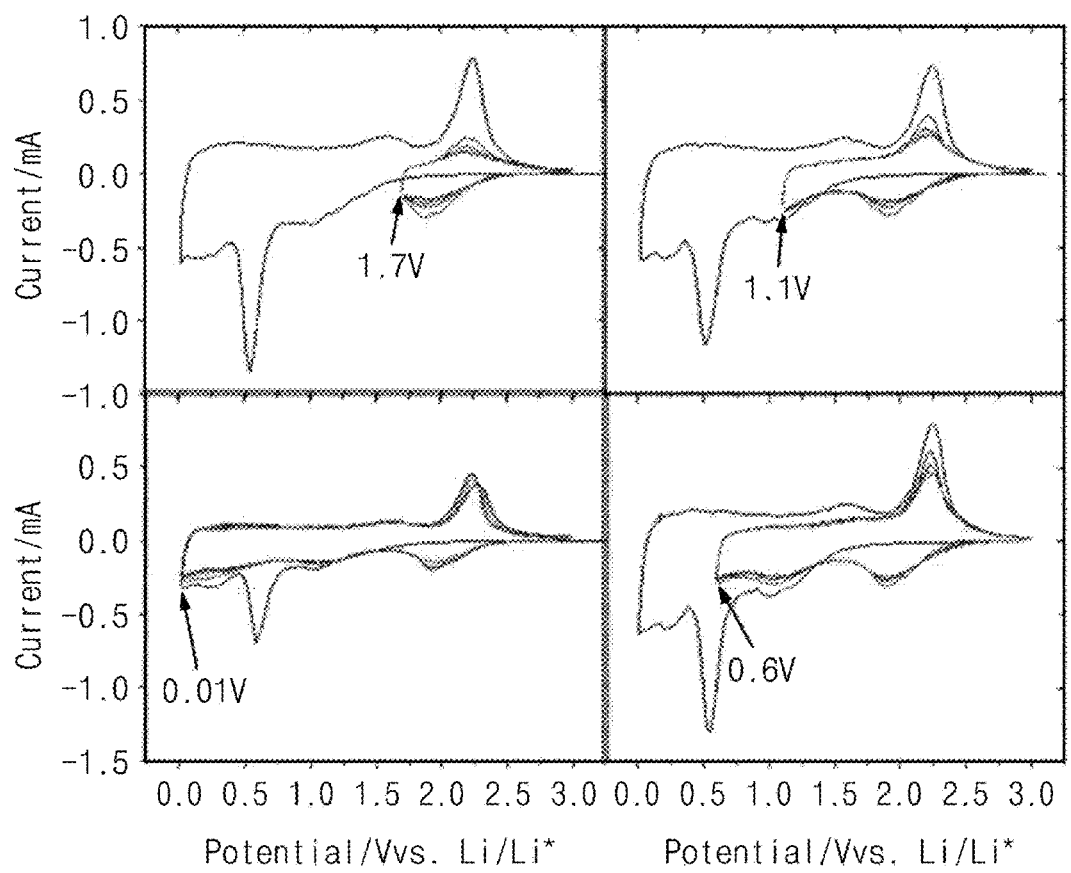

[FIG. 15]
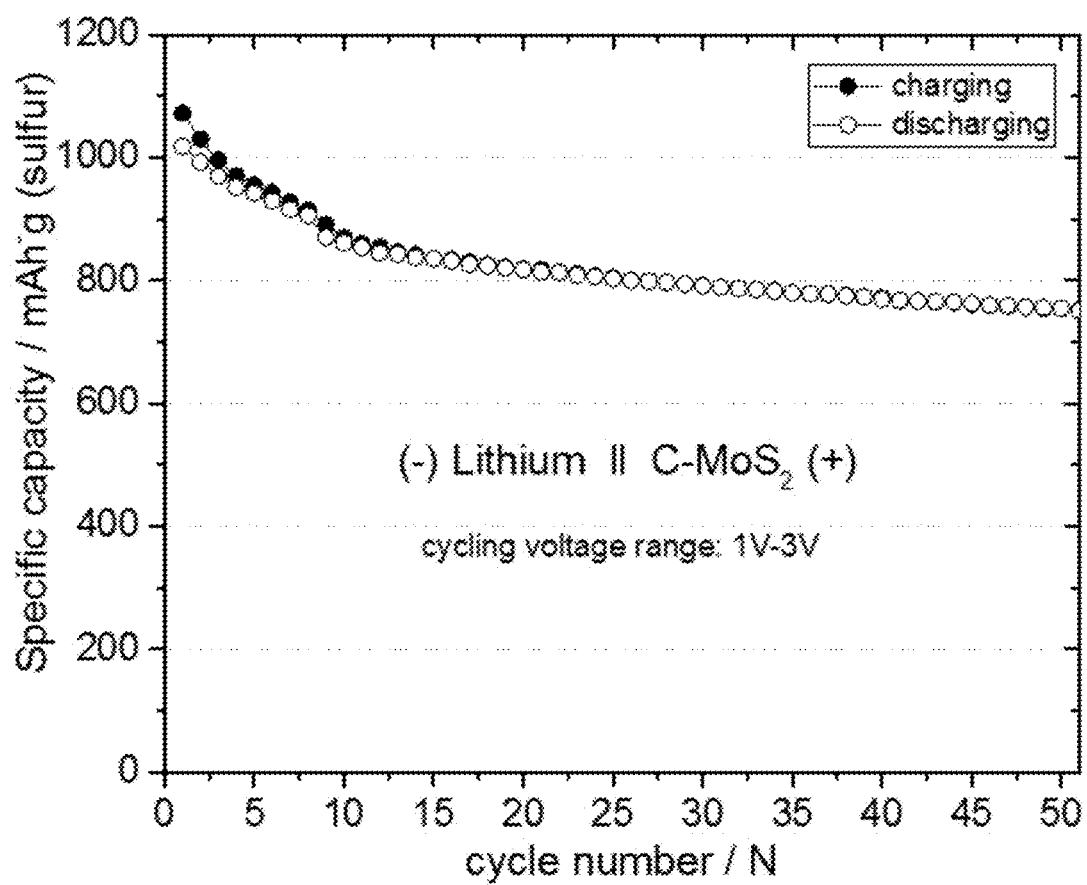

[FIG. 16]
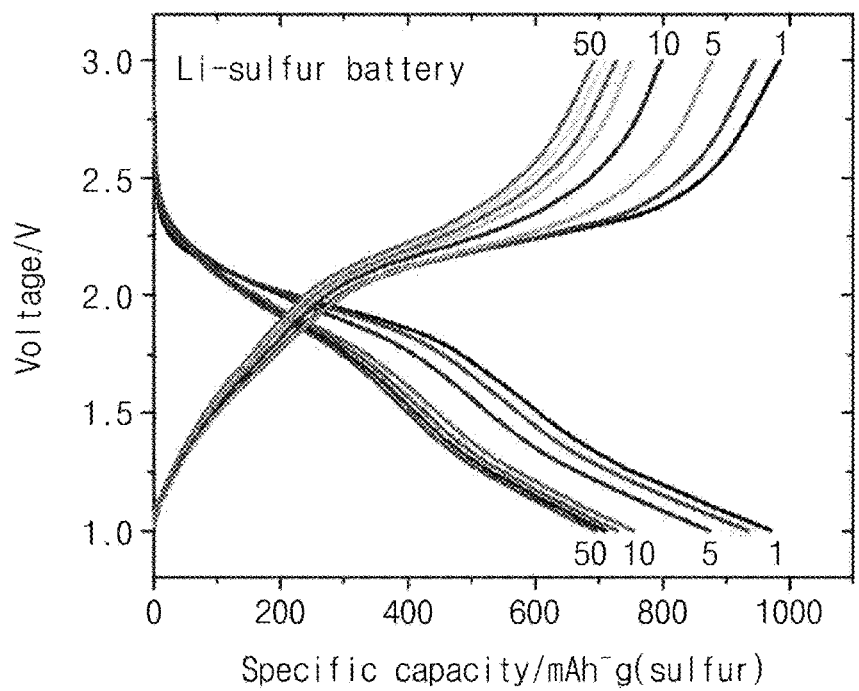

POSITIVE ACTIVE MATERIAL FOR LITHIUM-SULFUR BATTERY AND METHOD OF FABRICATING THE SAME

CROSS-REFERENCE TO RELATED APPLICATIONS

This application is a National Stage of International Application No. PCT/KR2018/015386 filed on Dec. 6, 2018, which claims priority under U.S.C. § 119(a) to Korean Patent Application No. 10-2017-0166638 filed on Dec. 6, 2017, the disclosure of which is incorporated herein in its entirety by reference.

TECHNICAL FIELD

Embodiments of the inventive concepts relate to a positive active material for a lithium-sulfur battery and a method of fabricating the same and, more particularly, to a positive active material for a lithium-sulfur battery, which includes molybdenum and sulfur, and a method of fabricating the same.

BACKGROUND ART

A rechargeable battery industry has developed with the development of techniques, competition between participating companies, and repeated processes of occurrence of new needs and overcoming of limitations of conventional techniques. Lithium ion rechargeable batteries used as key components of portable electronic devices and electric cars appeared on the market 20 years ago and have recently shown signs of change. Competition among battery companies (in particular, Chinese companies) is intensifying, and it may be difficult to improve performance of the lithium ion rechargeable batteries. In particular, lithium ion rechargeable batteries using a liquid or gel-type electrolyte have inherent limitations in terms of safety, such as the risk of ignition and explosion, and low impact resistance.

Due to these technical limitations, other various rechargeable batteries are being developed to replace the lithium ion rechargeable batteries. A lithium-sulfur battery among them uses sulfur and lithium as a positive electrode material and a negative electrode material, respectively, and thus an energy density of the lithium-sulfur battery may be 8 or more times higher than that of the lithium ion rechargeable battery. In addition, since the lithium-sulfur battery uses cheap sulfur, a fabrication cost of the lithium-sulfur battery may be reduced.

DISCLOSURE

Technical Problem

Embodiments of the inventive concepts may provide a positive active material for a lithium-sulfur battery, which is capable of improving reliability, and a method of fabricating the same.

Embodiments of the inventive concepts may also provide a positive active material for a lithium-sulfur battery, which is capable of improving a capacity, and a method of fabricating the same.

Embodiments of the inventive concepts may further provide a positive active material for a lithium-sulfur battery, which is capable of minimizing elution of sulfur, and a method of fabricating the same.

Embodiments of the inventive concepts may further provide a positive active material for a lithium-sulfur battery, which is capable of improving life characteristics, and a method of fabricating the same.

Embodiments of the inventive concepts may further provide a positive active material for a lithium-sulfur battery, in which a carbon layer and a metal compound layer are alternately stacked, and a method of fabricating the same.

Technical Solution

In an aspect, a positive active material for a lithium-sulfur battery may include carbon layers and metal compound layers alternately and repeatedly stacked. Each of the metal compound layers may include molybdenum and sulfur.

In some embodiments, each of the carbon layers may include a graphene layer or a graphene oxide layer.

In some embodiments, a distance between the metal compound layers may range from 5 Å to 15 Å.

In some embodiments, the carbon layer may be inherently provided between the metal compound layers.

In some embodiments, the positive active material for a lithium-sulfur battery may further include a carbon shell layer surrounding the carbon layers and the metal compound layers alternately and repeatedly stacked.

In another aspect, a positive active material for a lithium-sulfur battery may include a metal compound layer including molybdenum and sulfur and provided between a plurality of carbon layers. The metal compound layer may be inherently tied between the plurality of carbon layers.

In some embodiments, at least a portion of the metal compound layer may be provided as a monolayer.

In still another aspect, a lithium-sulfur battery may include a positive electrode including a positive active material, a negative electrode spaced apart from the positive electrode, and an electrolyte between the positive electrode and the negative electrode. The positive active material may include metal compound layers and carbon layers alternately and repeatedly stacked. Each of the metal compound layers may include molybdenum and sulfur, and molybdenum and sulfur of the metal compound layer may be chemically separated from each other by a preliminary charge/discharge process.

In some embodiments, sulfur separated from the metal compound layer may be bonded to lithium in a charge/discharge process to generate a lithium-sulfur compound, and the lithium-sulfur compound may be tied by the carbon layers to reduce elution of the lithium-sulfur compound into the electrolyte.

In yet another aspect, a method of fabricating a positive active material for a lithium-sulfur battery may include preparing a molybdenum source, a sulfur source, and a main carbon source, mixing the molybdenum source, the sulfur source, and the main carbon source with each other to obtain a mixture thereof, forming an intermediate product by performing a first thermal treatment on the mixture, and performing a second thermal treatment on the intermediate product to fabricate a positive active material comprising carbon layers and metal compound layers alternately and repeatedly stacked. Each of the metal compound layers may include molybdenum and sulfur.

In some embodiments, the intermediate product may include the metal compound layers and the main carbon sources, which are alternately and repeatedly stacked. Each of the metal compound layers may include molybdenum and sulfur in the intermediate product.

In some embodiments, a distance between the metal compound layers in the intermediate product may be greater than a distance between the metal compound layers in the positive active material.

In some embodiments, each of the carbon layers may include a graphene layer or a graphene oxide layer.

In some embodiments, the method may further may include adding an auxiliary carbon source to the intermediate product before the performing of the second thermal treatment on the intermediate product, and performing an auxiliary thermal treatment on the intermediate product and the auxiliary carbon source.

In some embodiments, a size of a molecule of the auxiliary carbon source may be greater than a distance between the metal compound layers in the intermediate product.

In some embodiments, the mixing of the molybdenum source, the sulfur source, and the main carbon source may include mixing the molybdenum source, the sulfur source, the main carbon source, and an auxiliary carbon source with each other to obtain a mixture thereof. A size of a molecule of the auxiliary carbon source may be greater than a size of a molecule of the main carbon source.

In some embodiments, the intermediate product may further include a carbon shell layer surrounding the metal compound layer and the main carbon source.

In some embodiments, the first thermal treatment may be performed at a first temperature, and the second thermal treatment may be performed in a nitrogen gas or inert gas atmosphere at a second temperature higher than the first temperature.

Advantageous Effects

The positive active material for a lithium-sulfur battery according to embodiments of the inventive concepts may include the carbon layers and the metal compound layers, which are alternately and repeatedly stacked. Each of the metal compound layers may include molybdenum and sulfur. The carbon layer may be inherently provided between the metal compound layers, and thus the metal compound layer may be inherently tied between the carbon layers.

As a result, when the lithium-sulfur battery is fabricated using the positive active material, it is possible to inhibit the lithium-sulfur compound, generated in the charge/discharge process, from being eluted into the electrolyte. Thus, the highly reliable lithium-sulfur battery with improved life and capacity characteristics may be realized.

DESCRIPTION OF DRAWINGS

FIG. 1 is a flowchart illustrating a method of fabricating a positive active material for a lithium-sulfur battery, according to some embodiments of the inventive concepts.

FIG. 2 is a schematic view illustrating a positive active material for a lithium-sulfur battery, according to some embodiments of the inventive concepts.

FIG. 3 is an enlarged view of a portion of FIG. 2.

FIG. 4 is a view illustrating a positive active material for a lithium-sulfur battery and a method of fabricating the same, according to a modified example of some embodiments of the inventive concepts.

FIG. 5 is a schematic view illustrating a rechargeable battery including a positive active material for a lithium-sulfur battery, according to some embodiments of the inventive concepts.

FIGS. 6 and 7 are transmission electron microscopy (TEM) images of a positive active material for a lithium-sulfur battery, according to an experimental example 1 of the inventive concepts.

FIG. 8 is a graph showing electron energy loss spectroscopy data of the positive active material for a lithium-sulfur battery, according to the experimental example 1 of the inventive concepts.

FIG. 9 is a cyclic voltammetry graph of a lithium-sulfur battery according to the experimental example 1 of the inventive concepts.

FIG. 10 is a schematic diagram illustrating a chemical reaction of sulfur in a charge/discharge process of a rechargeable battery including a positive active material for a lithium-sulfur battery, according to some embodiments of the inventive concepts.

FIG. 11 is a graph showing capacity characteristics according to a charge/discharge cycle number of lithium-sulfur batteries according to experimental examples 1 to 3 of the inventive concepts.

FIG. 12 is a graph showing capacity characteristics according to a current density of the lithium-sulfur batteries according to the experimental examples 1 to 3 of the inventive concepts.

FIG. 13 is a graph showing capacity characteristics according to a charge/discharge cycle number of a lithium ion battery using the positive active material for a lithium-sulfur battery according to the experimental example 1 of the inventive concepts as a negative active material.

FIG. 14 is a cyclic voltammetry graph according to a change in cutoff voltage of the lithium-sulfur battery according to the experimental example 1 of the inventive concepts.

FIG. 15 is a graph showing charge/discharge characteristics of the lithium-sulfur battery according to the experimental example 1 of the inventive concepts.

FIG. 16 is a graph showing relation between a voltage and a capacity per weight of the lithium-sulfur battery according to the experimental example 1 of the inventive concepts.

MODE FOR INVENTION

The inventive concepts will now be described more fully hereinafter with reference to the accompanying drawings, in which exemplary embodiments of the inventive concepts are shown. It should be noted, however, that the inventive concepts are not limited to the following exemplary embodiments, and may be implemented in various forms. Accordingly, the exemplary embodiments are provided only to disclose the inventive concepts and let those skilled in the art know the category of the inventive concepts.

It will be understood that when an element such as a layer, region or substrate is referred to as being "on" another element, it can be directly on the other element or intervening elements may be present. In addition, in the drawings, the thicknesses of layers and regions are exaggerated for clarity.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts. As used herein, the term "and/or" includes any and all combinations of one or more of the associated listed items.

The terminology used herein is for the purpose of describing particular embodiments only and is not intended to limit the invention. As used herein, the singular terms "a", "an" and "the" are intended to include the plural forms as well, unless the context clearly indicates otherwise. It will be further understood that the terms "comprises", "comprising", "includes", "including", "have", "has" and/or "having" when used herein, specify the presence of stated features, integers, steps, operations, elements, and/or components, but do not preclude the presence or addition of one or more other features, integers, steps, operations, elements, components, and/or groups thereof. Furthermore, it will be understood that when an element is referred to as being "connected" or "coupled" to another element, it may be directly connected or coupled to the other element or intervening elements may be present.

In addition, in explanation of the present invention, the descriptions to the elements and functions of related arts may be omitted if they obscure the subjects of the inventive concepts FIG. 1 is a flowchart illustrating a method of fabricating a positive active material for a lithium-sulfur battery, according to some embodiments of the inventive concepts. FIG. 2 is a schematic view illustrating a positive active material for a lithium-sulfur battery, according to some embodiments of the inventive concepts, and FIG. 3 is an enlarged view of a portion of FIG. 2.

Referring to FIGS. 1 and 2, a molybdenum source, a sulfur source, and a main carbon source are prepared (S110).

For example, the molybdenum source may be $Na_2MoO_4$ $2H_2O$ or $MoO_3$, and the sulfur source may be thiourea or thioacetamide. The main carbon source may include at least one of ethyleneglycol, diethylene glycol, triethylene glycol, polyethyleneglycol, antracene, naphthalene, benzene, acetylene, dopamine, quinone, alkyl amine (C2 to C12), or sucrose.

The molybdenum source, the sulfur source, and the main carbon source may be mixed with each other, and a first thermal treatment may be performed on a mixture thereof to form an intermediate product (S120). For example, the first thermal treatment may be performed in the atmosphere (i.e., in an air atmosphere) at 200° C. for 24 hours, and the intermediate product may be cleaned by water and ethanol after obtaining the intermediate product.

In some embodiments, the molybdenum source, the sulfur source, and the main carbon source may be mixed in a solvent (e.g., water), and the first thermal treatment may be performed on a mixture thereof to form the intermediate product.

Alternatively, in other embodiments, the main carbon source may be a solution including carbon. In this case, the molybdenum source, the sulfur source, and the main carbon source may be mixed with each other without an additional solvent, and the first thermal treatment may be performed on a mixture thereof to form the intermediate product.

The intermediate product may include metal compound layers and the main carbon sources, which are alternately and repeatedly stacked. Here, the metal compound layer may include molybdenum and sulfur. In other words, the mixture of the molybdenum source, the sulfur source and the main carbon source may be treated by the first thermal treatment to form the intermediate product in which the metal compound layers including molybdenum and sulfur and the main carbon sources are alternately and repeatedly stacked.

In the intermediate product, at least a portion of the metal compound layer may be provided as a monolayer of a compound (e.g., $MoS_2$) of molybdenum and sulfur.

A second thermal treatment may be performed on the intermediate product to fabricate a positive active material 100 for a lithium-sulfur battery, which includes carbon layers 110 and the metal compound layers 120 alternately and repeatedly stacked (S130). For example, the second thermal treatment may be performed in a nitrogen or argon atmosphere at a temperature of 200° C. to 1300° C. for a time of 2 hours to 5 hours.

The main carbon source between the metal compound layers 120 may be carbonized by the second thermal treatment. Thus, the main carbon source provided between the metal compound layers 120 in the intermediate product may be carbonized to form the carbon layer 110. For example, the carbon layer 110 may be a graphene layer or a graphene oxide layer.

Since the main carbon source between the metal compound layers 120 is carbonized to form the carbon layer 110, a distance between the metal compound layers 120 may be reduced. In other words, the distance between the metal compound layers 120 in the positive active material 100 for a lithium-sulfur battery may be smaller than a distance between the metal compound layers 120 in the intermediate product. For example, the distance between the metal compound layers 120 in the positive active material 100 for a lithium-sulfur battery may range from 5 Å to 15 Å.

In some embodiments, the temperature of the second thermal treatment may be higher than the temperature of the first thermal treatment. In addition, the second thermal treatment may be performed in a non-oxygen atmosphere or an inert gas atmosphere (e.g., the nitrogen or argon atmosphere), as described above. Thus, the main carbon source may be easily carbonized into the carbon layer 110.

Furthermore, in some embodiments, a time for which the first thermal treatment is performed may be longer than a time for which the second thermal treatment is performed.

As described above, according to some embodiments of the inventive concepts, the metal compound layer 120 including molybdenum and sulfur may be inherently provided between the carbon layers 110. In other words, a metal compound layer is not inserted between stacked carbon layers, but the positive active material 100 for a lithium-sulfur battery, in which the carbon layers 110 and the metal compound layers 120 are alternately and repeatedly stacked, may be fabricated by the process of mixing the main carbon source, the molybdenum source, and the sulfur source, the process of performing the first thermal treatment on the mixture to form the intermediate product, and the process of performing the second thermal treatment on the intermediate product. That is, the metal compound layers 120 may be formed before the formation of the carbon layers 110 in the structure in which the carbon layers 110 and the metal compound layers 120 are alternately and repeatedly stacked.

If a material having a structure, in which carbon layers and sulfur-containing layers are alternately and repeatedly stacked, is non-inherently fabricated using a process of inserting sulfur between stacked carbon layers unlike the aforementioned embodiment of the inventive concepts, sulfur of the sulfur-containing layer may easily escape to the outside. In addition, in this case, it is difficult to improve or increase a content of sulfur in the material. In particular, if the material is used as a positive active material of a lithium-sulfur battery, a lithium-sulfur compound generated in a charge/discharge process may be easily eluted into an electrolyte to deteriorate charge/discharge characteristics and life characteristics of the lithium-sulfur battery.

However, according to the aforementioned embodiments of the inventive concepts, the metal compound layer 120 may be inherently provided between the carbon layers 110, and thus the metal compound layer 120 may be inherently tied by the carbon layers 110. As a result, when a lithium-sulfur battery is fabricated using the positive active material 100 for a lithium-sulfur battery according to some embodiments of the inventive concepts, a lithium-sulfur compound generated in a charge/discharge process may be tied by the carbon layers 110, thereby minimizing or preventing elution of sulfur into an electrolyte. In addition, conductivity of the positive active material 100 for a lithium-sulfur battery may be improved by the carbon layer 110 between the metal compound layers 120. Furthermore, since the metal compound layer 120 is inherently provided between the carbon layers 110, it is possible to improve a content of sulfur in the positive active material 100 for a lithium-sulfur battery. In more detail, when a theoretical capacity of a pure sulfide is 1672 mAh/g, a theoretical weight ratio of a pure sulfide in a metal sulfide of the positive active material 100 according to the inventive concepts may be 40.1%, and the positive active material 100 may have a theoretical capacity of about 670 mAh/g, which corresponds to 40.1% of the theoretical capacity (i.e., 1672 mAh/g) of the pure sulfide. As a result, a high-capacity and long-life lithium-sulfur battery may be provided.

According to a modified example of some embodiments of the inventive concepts, a carbon shell layer may further be provided to surround carbon layers and metal compound layers which are alternately stacked. A positive active material for a lithium-sulfur battery and a method of fabricating the same, according to the modified example, will be described hereinafter with reference to FIG. 4.

FIG. 4 is a view illustrating a positive active material for a lithium-sulfur battery and a method of fabricating the same, according to a modified example of some embodiments of the inventive concepts.

Referring to FIG. 4, the molybdenum source, the sulfur source, and the main carbon source are prepared, as described with reference to FIGS. 1 to 3.

An auxiliary carbon source may further be prepared in addition to the main carbon source. In some embodiments, a size of a molecule of the auxiliary carbon source may be greater than a size of a molecule of the main carbon source. In more detail, the size of the molecule of the auxiliary carbon source may be greater than the distance between the metal compound layers in the intermediate product. Thus, the auxiliary carbon source may not be provided between the metal compound layers but may surround the intermediate product in which the metal compound layers and the main carbon sources are alternately and repeatedly stacked.

In some embodiments, the auxiliary carbon source may be mixed with the main carbon source, the molybdenum source and the sulfur source, and the first thermal treatment may be performed on a mixture of the auxiliary carbon source, the main carbon source, the molybdenum source and the sulfur source, as described with reference to FIGS. 1 to 3. Thus, the auxiliary carbon source may surround the intermediate product.

Alternatively, in other embodiments, the main carbon source, the molybdenum source and the sulfur source may be mixed with each other, and the first thermal treatment may be performed on the mixture thereof to form the intermediate product, as described with reference to FIGS. 1 to 3. Thereafter, the auxiliary carbon source may be mixed with the intermediate product. In this case, an auxiliary thermal treatment may be performed after mixing the intermediate product and the auxiliary carbon source. Thus, the auxiliary carbon source may surround the intermediate product.

A second thermal treatment may be performed on the intermediate product and the auxiliary carbon source surrounding the intermediate product. The second thermal treatment may be performed by the same method as described with reference to FIGS. 1 to 3.

The main carbon sources in the intermediate product and the auxiliary carbon source may be carbonized to form the carbon layers 110 and the carbon shell layer 130, respectively.

The carbon shell layer 130 may surround at least a portion of a surface of the positive active material 100 for a lithium-sulfur battery, in which the carbon layers 110 and the metal compound layers 120 are alternately and repeatedly stacked as described with reference to FIGS. 1 to 3.

According to the modified example of some embodiments of the inventive concepts, the carbon shell layer 130 may further be provided to surround the positive active material 100 for a lithium-sulfur battery, in which the metal compound layers 120 and the carbon layers 110 are alternately and repeatedly stacked. Thus, when a lithium-sulfur battery is fabricated using the positive active material having the carbon shell layer 130, a lithium-sulfur compound generated in a charge/discharge process may be tied by the carbon layers and may be surrounded by the carbon shell layer 130. Thus, elution of sulfur into an electrolyte may be minimized or prevented. As a result, a high-capacity and long-life lithium-sulfur battery may be provided.

A lithium-sulfur battery including the positive active material according to the modified example and/or the embodiment of the inventive concepts will be described hereinafter with reference to FIG. 5.

FIG. 5 is a schematic view illustrating a lithium-sulfur battery including a positive active material for a lithium-sulfur battery, according to some embodiments of the inventive concepts.

Referring to FIG. 5, a lithium-sulfur battery may include a positive electrode 210, a negative electrode 220, and an electrolyte 230 between the positive electrode 210 and the negative electrode 220. Even though not shown in FIG. 5, a separator may further be provided between the positive electrode 210 and the negative electrode 220.

The positive electrode 210 may include the positive active material for a lithium-sulfur battery, described with reference to FIGS. 1 to 4. In more detail, the positive electrode 210 may include a current collector and the positive active material for a lithium-sulfur battery deposited on the current collector. In more detail, sulfur included in the metal compound layer of the positive active material for a lithium-sulfur battery may function as a positive active material.

The negative electrode 220 may include lithium.

The electrolyte 230 may be an aqueous electrolyte or a non-aqueous electrolyte. However, a kind of the electrolyte 230 is not limited thereto and may be various.

A preliminary charge/discharge process may be performed before the lithium-sulfur battery is charged and discharged. The preliminary charge/discharge process may be performed one or more times. The preliminary charge/discharge process may be performed to electrochemically separate molybdenum and sulfur of the metal compound layer of the positive active material for a lithium-sulfur battery. The chemically separated sulfur in the metal compound layer may function as a positive active material. In other words, a metal and sulfur, which are chemically separated from each other in the metal compound layer, may be provided between the carbon layers in the positive active material for a lithium-sulfur battery.

Experimental examples of the positive active material for a lithium-sulfur battery according to embodiments of the inventive concepts will be described hereinafter.

Fabrication of Positive Active Material for Lithium-Sulfur Battery According to Experimental Example 1

$Na_2MoO_4$ used as a molybdenum source, thiourea used as a sulfur source, and ethylene glycol used as a main carbon source were prepared. 6.05 g of $Na_2MoO_4$ and 7.6 g of thiourea were provided into an autoclave, 200 mL of ethylene glycol and 300 mL of water were added into the autoclave, and a first thermal treatment was performed at 200° C. for 24 hours to form an intermediate product.

The intermediate product was obtained and was cleaned by water and ethanol.

A second thermal treatment was performed on the cleaned intermediate product at 800° C. in an argon atmosphere to fabricate a positive active material for a lithium-sulfur battery according to the experimental example 1, in which molybdenum sulfide layers and carbon layers were alternately and repeatedly stacked.

Fabrication of Positive Active Material for Lithium-Sulfur Battery According to Experimental Example 2

A positive active material for a lithium-sulfur battery was fabricated according to the experimental example 2. In the experimental example, a second thermal treatment was performed at 500° C. Other process conditions of the experimental example 2 were the same as corresponding process conditions of the experimental example 1. The positive active material according to the experimental example 2 included molybdenum sulfide layers and carbon layers which were alternately and repeatedly stacked.

Fabrication of Lithium-Sulfur Battery According to Experimental Example 1

A positive electrode was fabricated by mixing the positive active material for a lithium-sulfur battery according to the experimental example 1, a carbon black conductor, and a PVdF binder at a mixing ratio of 6:2:2, and lithium metal foil was used as a negative electrode. In addition, 1M $LiPF_6$ was used as lithium salt, and ethylene carbonate (EC) and dimethylcarbonate (DMC) were mixed with each other at a mixing ratio of 1:1. Thus, a lithium-sulfur battery according to the experimental example 1 was fabricated.

Fabrication of Lithium-Sulfur Battery According to Experimental Example 2

A lithium-sulfur battery according to the experimental example 2 was fabricated using the positive active material for a lithium-sulfur battery according to the experimental example 2 by substantially the same processes as the experimental example 1 described above.

Fabrication of Lithium-Sulfur Battery According to Experimental Example 3

A lithium-sulfur battery according to the experimental example 3 was fabricated using the intermediate product, which was generated in the processes of fabricating the positive active material for a lithium-sulfur battery according to the experimental example 1, by substantially the same processes as the experimental example 1 described above.

FIGS. 6 and 7 are transmission electron microscopy (TEM) images of a positive active material for a lithium-sulfur battery, according to an experimental example 1 of the inventive concepts.

Referring to FIGS. 6 and 7, TEM images of the positive active material for a lithium-sulfur battery according to the experimental example 1 were acquired.

As shown in FIGS. 6 and 7, the positive active material for a lithium-sulfur battery according to the experimental example 1 has the structure in which the molybdenum sulfide layers and the carbon layers are alternately and repeatedly stacked. In addition, as shown in FIG. 7, a distance between the molybdenum sulfide layers is about 0.65 nm.

FIG. 8 is a graph showing electron energy loss spectroscopy data of the positive active material for a lithium-sulfur battery, according to the experimental example 1 of the inventive concepts.

Referring to FIG. 8, element ratios according to a scan depth of the positive active material for a lithium-sulfur battery according to the experimental example 1 were measured. As shown in FIG. 8, concentrations of sulfur and molybdenum decrease as a concentration of carbon increases, and the concentrations of sulfur and molybdenum increase as the concentration of carbon decreases. In addition, the concentrations of sulfur and molybdenum have valley values when the concentration of carbon has a peak value, and the concentrations of sulfur and molybdenum have peak values when the concentration of carbon has a valley value. In other words, it is recognized that the carbon layers and the molybdenum sulfide layers are alternately and repeatedly stacked.

FIG. 9 is a cyclic voltammetry graph of a lithium-sulfur battery according to the experimental example 1 of the inventive concepts.

Referring to FIG. 9, a cyclic voltammetry of the lithium-sulfur battery including the positive active material according to the experimental example 1 was measured at a sweep rate of 0.05 mV/sec under a voltage condition of 0.01V to 3V.

In a first charge/discharge cycle, a peak value was detected by the molybdenum sulfide layer included in the positive active material for a lithium-sulfur battery according to the experimental example 1. As shown in FIG. 9, from a second charge/discharge cycle, a charge/discharge process is performed in a state in which molybdenum and sulfur are chemically separated from each other in the molybdenum sulfide layer included in the positive active material.

FIG. 10 is a schematic diagram illustrating a chemical reaction of sulfur in a charge/discharge process of a lithium-sulfur battery including molybdenum and sulfur, according to some embodiments of the inventive concepts. Molybdenum (Mo) and lithium sulfide ($Li_2S$) are formed through a lithium intercalation reaction (1) and a lithium conversion reaction (2). Next, a sulfur element ($S_8$) is generated through a lithium deintercalation reaction (3). As charge/discharge reactions are continuously performed, the electrochemical reactions (1) to (3) decrease but a lithium intercalation/deintercalation reaction (4) increases. The reaction (4) is the same as an electrochemical reaction of a conventional lithium-sulfur battery.

In detail, as illustrated in FIG. 10, sulfur chemically separated from the metal compound layer by the preliminary charge/discharge process reacts with lithium to generate a lithium-sulfur compound ($Li_2S \leftrightarrow S$). In more detail, in lithiation, $Li_2S$ and Mo are generated through the lithium intercalation reaction ($MoS_2 + xLi^+ + xe^- \rightarrow Li_xMoS_2$) and the conversion reaction ($Li_xMoS_2 \rightarrow Li_2S + Mo$). In delithiation, $Li_2S$ is oxidized into the sulfur element (S). As the number of charge/discharge cycle increases, $MoS_2$ may be electrochemically divided into Mo and S. In this process, the lithium-sulfur compound may be tied by the carbon layers to inhibit sulfur from being eluted into an electrolyte to form a polysulfide on a lithium negative electrode.

In other words, $MoS_2$ is divided into the molybdenum metal element and lithium-sulfur ($Li_2S$) through the lithium intercalation reaction ($MoS_2+Li++e- \rightarrow Li_xMoS_2$) and the lithium conversion reaction ($Li_xMoS_2 \rightarrow Mo+Li_2S$) in the first charge/discharge cycle. In discharging, $MoS_x$ and the sulfur element ($S_8$) are generated by the lithium deintercalation reaction. FIG. 10 shows the case in which $MoS_2$ triggers the lithium intercalation/deintercalation reaction of sulfur by the first charge/discharge cycle.

FIG. 11 is a graph showing capacity characteristics according to a charge/discharge cycle number of lithium-sulfur batteries according to experimental examples 1 to 3 of the inventive concepts.

Referring to FIG. 11, capacity characteristics according to a charge/discharge cycle number of the lithium-sulfur battery 800 according to the experimental example 1, the lithium-sulfur battery 500 according to the experimental example 2 and the lithium-sulfur battery RT according to the experimental example 3 were measured by a constant current constant voltage (CCCV) measuring method under conditions of a voltage of 0.01V to 3V and a current density of 0.1 C.

The lithium-sulfur battery according to the experimental example 3 including the intermediate product on which the second thermal treatment is not performed has a very high initial capacity loss and a capacity of 100 mAh/g or less. On the contrary, the lithium-sulfur batteries according to the experimental examples 1 and 2 including the positive active materials on which the second thermal treatments are performed according to the inventive concepts have capacities ranging from 600 mAh/g to 850 mA/g. In addition, the capacity of the lithium-sulfur battery 500 including the positive active material treated by the second thermal treatment of 500° C. is higher than the capacity of the lithium-sulfur battery 800 including the positive active material treated by the second thermal treatment of 800° C.

FIG. 12 is a graph showing capacity characteristics according to a current density of the lithium-sulfur batteries according to the experimental examples 1 to 3 of the inventive concepts.

Referring to FIG. 12, capacity characteristics according to a charge/discharge cycle number of the lithium-sulfur batteries 800, 500 and RT according to the experimental examples 1, 2 and 3 were measured under conditions that a C-rate was controlled from 0.05 C to 2 C and then was controlled from 2 C to 0.05 C and 10 cycles were maintained at each C-rate.

As shown in FIG. 12, the lithium-sulfur battery RT according to the experimental example 3 including the intermediate product, on which the second thermal treatment is not performed, does not substantially operate. The lithium-sulfur battery 800 including the positive active material treated by the second thermal treatment of 800° C. shows excellent rate capability characteristics, as compared with the lithium-sulfur battery 500 including the positive active material treated by the second thermal treatment of 500° C. In particular, the lithium-sulfur battery 800 has a capacity of 550 mAh/g at a condition of 2C.

FIG. 13 is a graph showing capacity characteristics according to a charge/discharge cycle number of a lithium ion battery using the positive active material for a lithium-sulfur battery according to the experimental example 1 of the inventive concepts as a negative active material.

Referring to FIG. 13, the positive active material for a lithium-sulfur battery according to the experimental example 1 was used as a negative electrode, and a general lithium-cobalt oxide ($LiCoO_2$) was used as a positive electrode. In addition, 1M $LiPF_6$ was used as lithium salt, and ethylene carbonate (EC) and dimethylcarbonate (DMC) were mixed with each other at a mixing ratio of 1:1. Thus, a lithium ion battery (full cell) was fabricated. Thereafter, a capacity according to a charge/discharge cycle number of the lithium ion battery was measured by a CCCV test method under a condition of 100 mA/g (constant current). As shown in FIG. 13, the lithium ion battery has a capacity of about 700 mAh/g while the charge/discharge process is performed 55 times. In other words, the compound of molybdenum and sulfur according to the embodiments of the inventive concepts can be used as a negative active material for a lithium-sulfur battery as well as the positive active material for a lithium-sulfur battery.

FIG. 14 is a cyclic voltammetry graph according to a change in cutoff voltage of the lithium-sulfur battery according to the experimental example 1 of the inventive concepts.

Referring to FIG. 14, a cyclic voltammetry according to a change in lower cutoff voltage was measured in charging/discharging of the lithium-sulfur battery according to the experimental example 1. The lower cutoff voltages were 1.7V, 1.1V, 0.6V, and 0.01V. The results of the present experiment show that the lithium conversion reaction occurs in a lithium-inserted material (i.e., $Li_xMoS_2$) under a condition of 0.6V or less to generate a sulfur element and that the generated sulfur element affects the electrochemical reaction of the lithium-sulfur battery.

FIG. 15 is a graph showing charge/discharge characteristics of the lithium-sulfur battery according to the experimental example 1 of the inventive concepts.

Referring to FIG. 15, charge/discharge characteristics of the lithium-sulfur battery based on the MoS2 positive active material according to the experimental example 1 of the inventive concepts were evaluated. Charge/discharge cycles were performed 5 times in a cycle voltage range of 10 mV to 3V, and the charge/discharge characteristics were evaluated between 1V and 3V. An initial charge capacity was 1100 mAh/g, a charge/discharge capacity of 780 mAh/g was shown at 50 cycles, and a coulombic efficiency was about 100%. A capacity per weight of the lithium-sulfur battery according to the experimental example 1 is three to four times greater than that of a lithium ion battery including a conventional $LiCoO_2$ positive active material.

FIG. 16 is a graph showing relation between a voltage and a capacity per weight of the lithium-sulfur battery according to the experimental example 1 of the inventive concepts.

Referring to FIG. 16, relation between a voltage and a capacity per weight of the positive active material for a lithium-sulfur battery according to the experimental example 1 was measured. A cell formation was performed 5 times with 100 mA/g between 10 mV and 3V, charge/discharge characteristics were evaluated with the same current density between 1V and 3V. Charge/discharge of the lithium-sulfur battery occurs at about 1.9V/2.1V.

The positive active material for a lithium-sulfur battery according to embodiments of the inventive concepts may include the carbon layers and the metal compound layers, which are alternately and repeatedly stacked. Each of the metal compound layers may include molybdenum and sulfur. The carbon layer may be inherently provided between the metal compound layers, and thus the metal compound layer may be inherently tied between the carbon layers.

As a result, when the lithium-sulfur battery is fabricated using the positive active material, it is possible to inhibit the lithium-sulfur compound, generated in the charge/discharge process, from being eluted into the electrolyte. Thus, the highly reliable lithium-sulfur battery with improved life and capacity characteristics may be realized.

While the inventive concepts have been described with reference to exemplary embodiments, it will be apparent to those skilled in the art that various changes and modifications may be made without departing from the spirits and scopes of the inventive concepts. Therefore, it should be understood that the above embodiments are not limiting, but illustrative. Thus, the scopes of the inventive concepts are to be determined by the broadest permissible interpretation of the following claims and their equivalents, and shall not be restricted or limited by the foregoing description.

INDUSTRIAL APPLICABILITY

The lithium-sulfur battery including the positive active material according to the aforementioned embodiments of the inventive concepts may be applied to various applications. For example, the lithium-sulfur battery according to embodiments of the inventive concepts may be applied to electric cars. The applications of the lithium-sulfur battery according to embodiments of the inventive concepts are not limited thereto but may be applied to other various fields such as energy storage systems (ESS) and mobile electronic devices.

The invention claimed is:

1. A positive active material for a lithium-sulfur battery, comprising:
    graphene layers and metal compound layers alternately and repeatedly stacked; and
    a carbon shell layer surrounding the graphene layers and the metal compound layers alternately and repeatedly stacked,
    wherein each of the metal compound layers includes molybdenum and sulfur, and
    wherein the carbon shell layer is thicker than the graphene layers.

2. The positive active material for a lithium-sulfur battery of claim 1, wherein a distance between the metal compound layers ranges from 5 Å to 15 Å.

3. A positive active material for a lithium-sulfur battery, comprising:
    a metal compound layer including molybdenum and sulfur and provided between a plurality of graphene layers; and
    a carbon shell layer surrounding the metal compound layer provided between the plurality of graphene layers,
    wherein the metal compound layer is inherently tied between the plurality of carbon layers, and
    wherein the carbon shell layer is thicker than the graphene layers.

4. The positive active material for a lithium-sulfur battery of claim 3, wherein at least a portion of the metal compound layer is provided as a monolayer.

5. A lithium-sulfur battery comprising:
    a positive electrode including a positive active material;
    a negative electrode spaced apart from the positive electrode; and
    an electrolyte between the positive electrode and the negative electrode,
    wherein the positive active material comprises metal compound layers and graphene layers alternately and repeatedly stacked, and a carbon shell layer surrounding the metal compound layers and the graphene layers alternately and repeatedly stacked,
    wherein each of the metal compound layers includes molybdenum and sulfur,
    wherein molybdenum and sulfur of the metal compound layer are chemically separated from each other by a preliminary charge/discharge process, and
    wherein the carbon shell layer is thicker than the graphene layers.

6. The lithium-sulfur battery of claim 5, wherein sulfur separated from the metal compound layer is bonded to lithium in a charge/discharge process to generate a lithium-sulfur compound, and
    wherein the lithium-sulfur compound is tied by the carbon layers.

7. A method of fabricating a positive active material for a lithium-sulfur battery, the method comprising:
    preparing a molybdenum source, a sulfur source, and a main carbon source;
    mixing the molybdenum source, the sulfur source, and the main carbon source with each other to obtain a mixture thereof;
    forming an intermediate product by performing a first thermal treatment on the mixture; and
    performing a second thermal treatment on the intermediate product to fabricate a positive active material comprising graphene layers and metal compound layers alternately and repeatedly stacked,
    wherein each of the metal compound layers includes molybdenum and sulfur, and
    wherein the main carbon source comprises at least one of ethyleneglycol, diethylene glycol, triethylene glycol, polyethyleneglycol, antracene, naphthalene, benzene, acetylene, dopamine, quinone, alkyl amine (C2~C12), or sucrose.

8. The method of claim 7, wherein the intermediate product comprises: the metal compound layers and the main carbon source, which are alternately and repeatedly stacked, and
    wherein each of the metal compound layers includes molybdenum and sulfur in the intermediate product.

9. The method of claim 8, wherein a distance between the metal compound layers in the intermediate product is greater than a distance between the metal compound layers in the positive active material.

10. The method of claim 7, further comprising:
    adding an auxiliary carbon source to the intermediate product before the performing of the second thermal treatment on the intermediate product; and
    performing an auxiliary thermal treatment on the intermediate product and the auxiliary carbon source.

11. The method of claim 10, wherein a size of a molecule of the auxiliary carbon source is greater than a distance between the metal compound layers in the intermediate product.

12. The method of claim 7, wherein the mixing of the molybdenum source, the sulfur source, and the main carbon source comprises:
    mixing the molybdenum source, the sulfur source, the main carbon source, and an auxiliary carbon source with each other to obtain the mixture thereof,
    wherein a size of a molecule of the auxiliary carbon source is greater than a size of a molecule of the main carbon source.

13. The method of claim 10, wherein the intermediate product further comprises a carbon shell layer surrounding the metal compound layer and the main carbon source.

14. The method of claim 7, wherein the first thermal treatment is performed at a first temperature, and
wherein the second thermal treatment is performed in a nitrogen gas or inert gas atmosphere at a second temperature higher than the first temperature.

* * * * *